United States Patent
Rottmayer et al.

[19]
[11] Patent Number: 5,986,978
[45] Date of Patent: Nov. 16, 1999

[54] READ/WRITE HEAD AND METHOD FOR MAGNETIC READING AND MAGNETO-OPTICAL WRITING ON A DATA STORAGE MEDIUM

[75] Inventors: Robert E. Rottmayer, Fremont; Charles C- K Cheng, Cupertino; Xizeng Shi, Union City; Lijun Tong, Fremont; Hua-Ching Tong, San Jose, all of Calif.

[73] Assignee: Read-Rite Corporation, Milpitas, Calif.

[21] Appl. No.: 09/005,914

[22] Filed: Jan. 12, 1998

[51] Int. Cl.$^6$ .............................. G11B 11/00; G11B 5/127
[52] U.S. Cl. ............................................... 369/13; 360/113
[58] Field of Search .............................. 369/13, 112, 110, 369/116, 44.15; 360/114, 59, 113, 110, 119, 120, 122

[56] References Cited

U.S. PATENT DOCUMENTS

| | | | |
|---|---|---|---|
| 5,199,090 | 3/1993 | Bell ........................................... | 385/33 |
| 5,247,413 | 9/1993 | Shibata et al. ........................... | 360/113 |
| 5,272,582 | 12/1993 | Shibata et al. ........................... | 360/126 |
| 5,295,122 | 3/1994 | Murakami et al. ...................... | 369/1.3 |
| 5,353,268 | 10/1994 | Hintz ........................................ | 369/13 |
| 5,446,613 | 8/1995 | Rottmayer et al. ..................... | 360/113 |
| 5,576,914 | 11/1996 | Rottmayer et al. ..................... | 360/113 |
| 5,726,964 | 3/1998 | Van Kesteren et al. ................ | 369/112 |

OTHER PUBLICATIONS

Ikeda et al. "MR Sensor for Magnetic Encoder", IEEE Translation Journal on Magnetics in Japan, vol. 7, No. 9, Sep. 1992, pp. 705–713.

Chien et al., Giant Negative Magnetoresistive in Granular Ferromagnetic Systems:, Journal of Applied Physics, 73 (10), May 1993, pp. 5309–5314.

Yamamoto et al., "Magnetoresistance of Multilayers", IEEE Transactional Journal of Magnetics in Japan, vol. 7, No. 9, Sep. 1992, pp. 674–684.

*Primary Examiner*—Ali Neyzari
*Attorney, Agent, or Firm*—Robert King; Samuel Kassatly

[57] ABSTRACT

A read/write head is structurally significantly less complicated than optical reading devices, requires minimal or no optical alignment, capable of writing at higher track densities, and has better control of the data and servo tracks than conventional magnetic heads. The head is also capable of using an available heat source and a relatively weak magnetic field, such as 300 Oersteds, to write data on a data storage medium. The combination of a magnetic read sensor with a near field magneto-optical (MO) write element creates a hybrid read/write head capable of high density recording with a high signal to noise ratio. The integration of the MO write element can be accomplished by various alternative or complementary methods. One method is to mount a heat source, such as a laser or light source on a slider with minimal or no additional optical components. Another method is to form an optical channel (or waveguide) in the slider and/or in the magnetic write element for directing a laser beam onto a target spot on, or within the data storage medium. Since magneto-optical recording requires a magnetic field of a few hundred Oersteds, the head utilizes write poles of magnetic materials operated at a low magnetic field. This is a significant simplification over existing magnetic and MO read/write heads, since the track width of the data storage medium is defined by the laser beam width and not by the pole width. In a preferred embodiment, a giant magneto-resistive (GMR) element is selected as a read element.

61 Claims, 14 Drawing Sheets

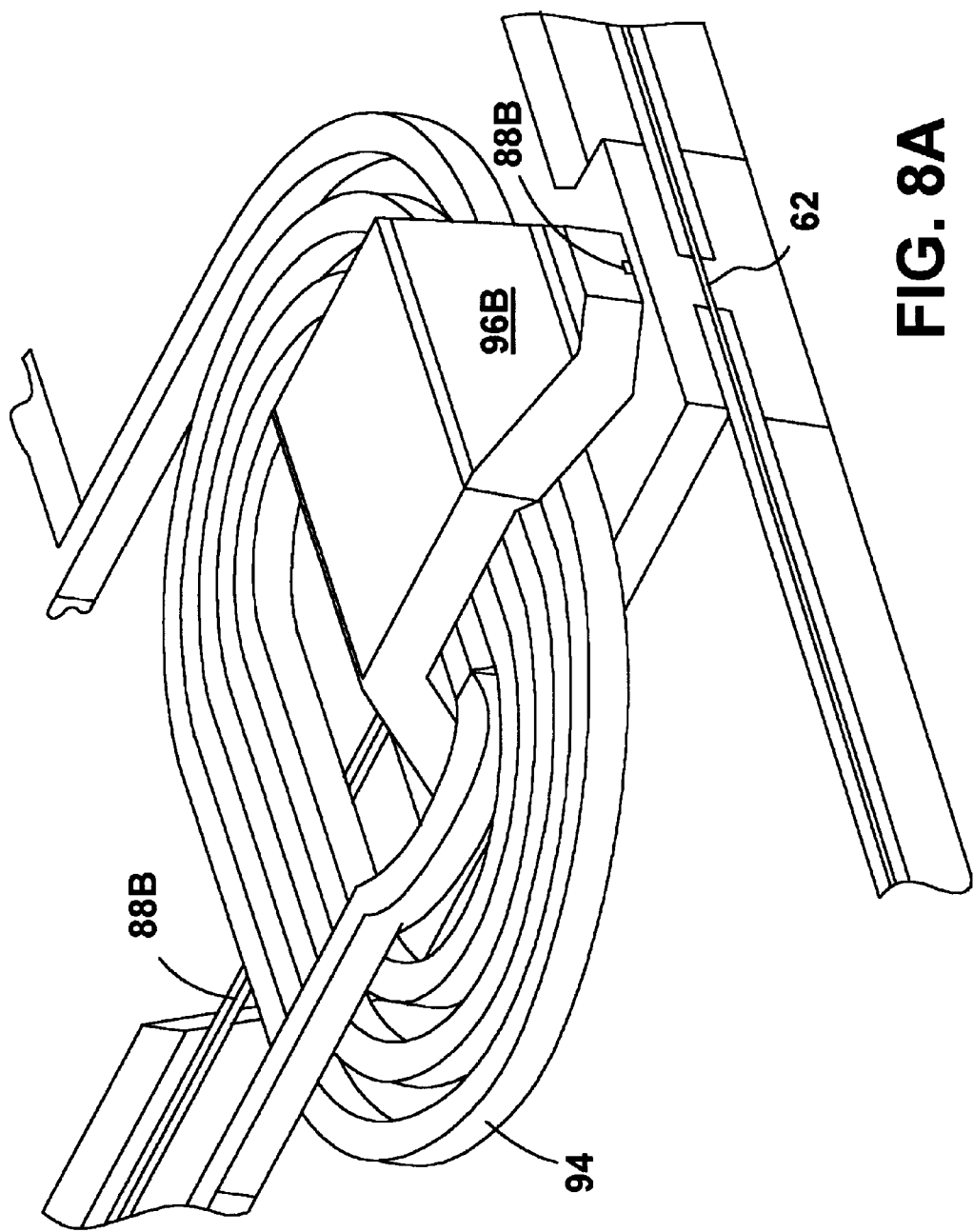

READ/WRITE HEAD AND METHOD FOR MAGNETIC READING AND MAGNETO-OPTICAL WRITING ON A DATA STORAGE MEDIUM

BACKGROUND OF THE INVENTION

1. Field of the Invention

The present invention relates in general to data storage systems such as disk drives. This invention relates in particular to a read/write head for use in optical and magneto-optical data storage systems to enable hybrid transduction of data from, and to a storage medium. More specifically, the head allows the magnetic reading of data from the magnetic medium, and the magneto-optical or thermally assisted writing of data on the storage medium.

2. Description of Related Art

A conventional magnetic storage system includes a magnetic head that has a slider element and a magnetic read/write element, and is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

Flying head designs have been proposed for use with optical and magneto-optical (MO) storage technology. One motivation for using the magneto-optical technology stems from the availability of higher areal density with magneto-optical storage disks than magnetic storage disks. However, despite the historically higher areal storage density available for magneto-optical disks drives, the prior art magneto-optical disk drive volumetric storage capacity has generally not kept pace with the volumetric storage capacity of magnetic disk drives.

One limiting factor in conventional optical reading heads is the low signal to noise ratio exhibited by such heads at high data transfer rates, since the frequency dependence of laser notse is typically exponential.

Another limiting factor is that optical reading heads require extensive alignment of the optical components and their respective polarizations, rendering the design, manufacturing and assembly of optical heads significantly complex.

Another factor that limits writing (or recording) on a magnetic disk at high data transfer rates (or frequencies) using conventional magnetic heads is the required high magnetic field and field gradient. High magnetic fields are difficult to achieve, particularly with narrow tracks and miniaturized heads, because it is difficult to channel magnetic flux through such narrow structures, and further because the small pole structure is hard to define due to its large aspect ratio (height/width), usually greater than 2:1.

Therefore, there is still a long felt and still unsatisfied need for a read/write head that is structurally significantly less complicated than optical reading devices, that requires minimal or no optical alignment, that can write at higher track densities, and that has better control of the data and servo tracks than conventional magnetic heads. It would also be desirable for the head to be capable of using an available heat source and a relatively weak magnetic field, such as 300 Oersteds, to write data on a data storage medium.

SUMMARY OF THE INVENTION

One aspect of the present invention is to satisfy the foregoing need by providing a proximity magnetic recording head of high track density, combined with a near field magneto-optical (MO) write element, in order to create a read/write head capable of high density recording with a high signal to noise ratio.

The integration of the MO write element can be accomplished by various alternative or complementary methods. One method is to mount a heat source, such as a laser or light source on a slider with minimal or no additional optical components. Another method is to form an optical channel (or waveguide) in the slider and/or in the magnetic write element for directing a laser beam onto a target spot on, or within the data storage medium. Since magneto-optical recording requires a magnetic field of a few hundred Oersteds, the head utilizes write poles of magnetic materials operated at a low magnetic field. This is a significant simplification over existing magnetic and MO read/write heads, since the track width of the data storage medium is defined by the laser beam width and not by the pole width. In a preferred embodiment, a giant magneto-resistive (GMR) element is selected as a read element.

The read/write head of the present invention can be adapted for universal use with magnetic, optical, or magneto-optical data storage media (e.g. a disk). The head is capable of recording and reading horizontally oriented domain data bits on the disk, thereby enabling its use in magnetic disk drives. The head is further capable of recording and reading vertically oriented domain data bits on the disk, thereby enabling its use in optical and MO drives.

The read/write head increases the aerial density of the storage medium as it enhances the servo-writing process by reducing the normally wasted "dead space" between tracks. The magnetic read operation yields a significantly better wide band signal to noise ratio than the optical read, which enhances the head performance especially at high frequencies. Since the head requires little or no optical alignment, it is significantly simpler and cheaper to build than conventional optical read/write heads, and it further provides better writing capabilities at high track densities than conventional magnetic recording systems.

BRIEF DESCRIPTION OF THE DRAWINGS

The features of the present invention and the manner of attaining them, will become apparent, and the invention itself will be understood by reference to the following description and the accompanying drawings, wherein:

FIG. 3A is an enlarged view of a first pole (Pole 1/Shield 2) forming part of the read/write element of FIG. 3, illustrating an optical channel according to the present invention, and a light source in close proximity to the optical channel;

FIG. 8A is a perspective view of the read/write element of FIG. 8

Similar numerals in the drawings refer to similar elements. It should be understood that the sizes of the different components in the figures may not be in exact proportion, and are shown for visual clarity and for the purpose of explanation.

DETAILED DESCRIPTION OF THE INVENTION

Figure 1:
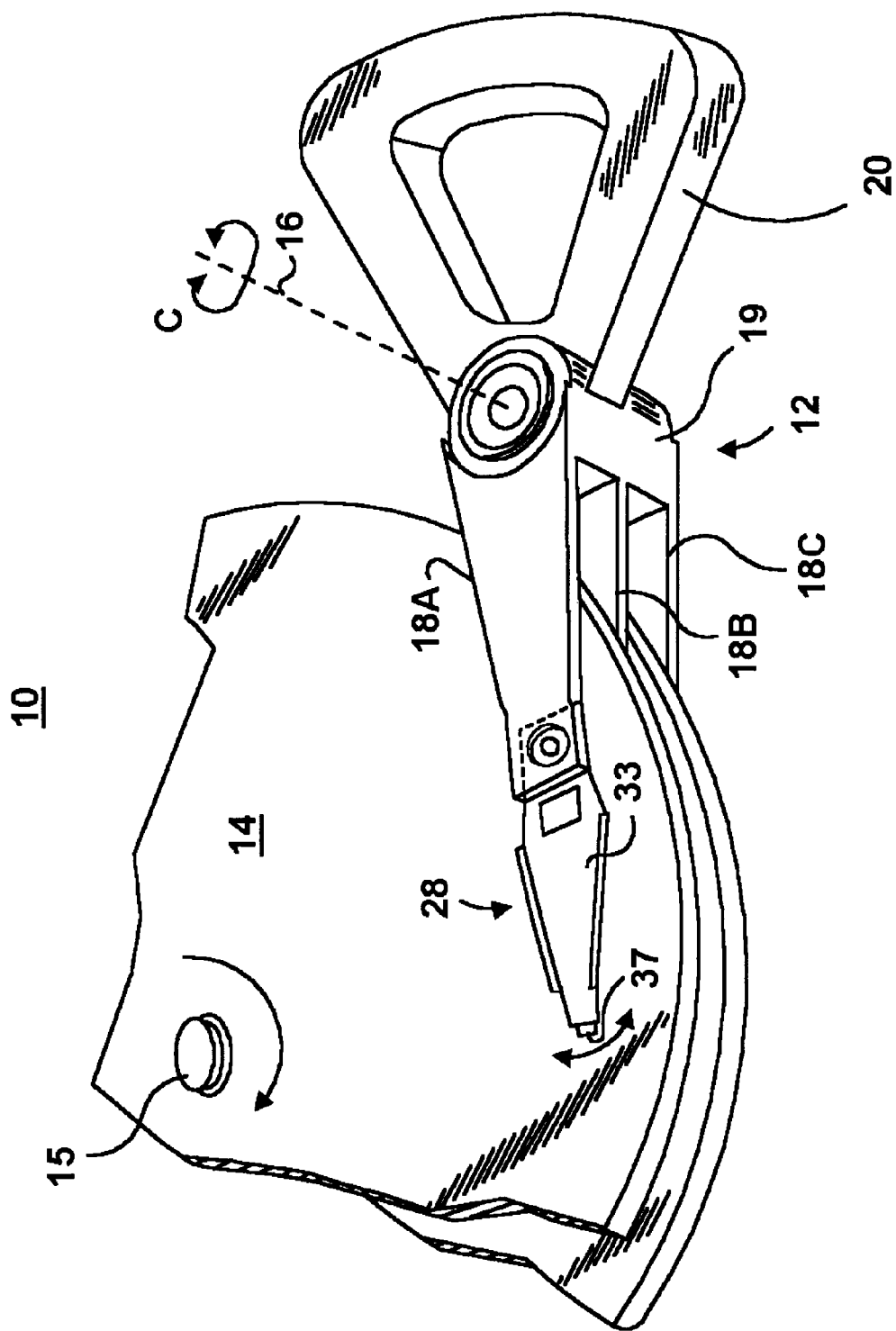
FIG. 1 is a fragmentary perspective view of a data storage system utilizing a read/write head according to the invention.

FIG. 1 illustrates a disk drive 10 comprised of a head stack assembly 12 and a stack of spaced apart magnetic, optical and/or MO data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

A head gimbal assembly (HGA) 28 is secured to each of the actuator arms, for instance 18A. As further illustrated in FIG. 2, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40; and a read/write element 50 supported by the slider 47. In the example illustrated in FIG. 2, the read/write element 50 is secured to the trailing end 55 of the slider 47. The slider 47 is also referred to herein as a support element since it supports the read/write element 50. The slider 47 may be any conventional or available slider or the slider described later in connection with FIG. 10.

The details of the read/write element 50 will now be described with reference to FIGS. 3, 3A, 4, 5 and 6. The read/write element 50 is a hybrid transducer that integrates an opto-inductive write section 60 and a magnetic read section 61. The magnetic read section 61 is formed of a first shield layer (Shield 1) 80 preferably made of a material that is both magnetically and electrically conductive. For example, the first shield layer 80 can have a nickel-iron composition, such as Permalloy, or a ferromagnetic composition with high permeability. The thickness of the first shield layer 80 is in the range of approximately 0.5 micron to approximately 14 microns, and preferably in the range of approximately 1 microns to approximately 4 microns.

A first contact element 82 (FIGS. 4, 5) made of an electrically conductive and magnetically nonconductive material, is formed over a forward portion of the first shield layer 80. The first contact element 82 can be composed of one or a combination of electrically conductive, magnetically non-conductive materials selected for example from the group formed of: copper (Cu), gold (Au), silver to (Ag), and alloys of these metals. The thickness of the first contact element 82 is in the range of approximately 50 angstroms to 5000 angstroms and preferably in the range of approximately 100 angstroms to approximately 500 angstroms. The first contact can be used as a voltage lead in a four-lead embodiment.

The magnetic read section 61 is comprised of a giant magnetoresistive (GMR) element 62, and is formed over the first contact element 82. The GMR element 62 may be formed, by way of example, by depositing a plurality of alternating ultra-thin layers of magnetically conductive and nonconductive materials such as Permalloy (Ni80 Fe20) and copper (Cu), each layer being approximately 10 to 30 angstroms thick. The electric resistance of the GMR element 62 fluctuates when exposed to a time-varying magnetic flux. Unlike inductive transducers, a magnetoresistive element is sensitive to the magnitude of a flux density at the transition rather than to the rate of change of the flux density at the transition. This gives the magnetoresistive element 62 certain advantages over inductive transducers, such as insensitivity to disk speed changes. The overall thickness of the GMR element 62 is in the range of approximately 30 angstroms to approximately 3000 angstroms, and preferably in the range of approximately 50 angstroms to approximately 2000 angstroms.

A second contact element 84, made of an electrically conductive magnetically non-conductive material that may be similar or equivalent to that of the first contact element 82, is formed over the GMR element 62. The thickness of the second contact element 84 is substantially the same as that of the first contact element 82.

An insulating layer 86, which may be made of aluminum oxide or silicon nitride, for example, is formed over substantially the entire length of the first shield layer 80 to define a non-magnetic, transducing read gap 87. The insulating layer 86 is located over the first shield layer 80 and around the magnetic read section 61, the first contact element 82, and the second contact element 84.

The magnetic read section 61 is also comprised of a second shield layer (Shield 2) 85, made of an electrically and magnetically conductive material that may be similar or equivalent to that of the first shield layer 80, is formed over the second contact element 84. The thickness of the second shield layer 85 is substantially similar or equivalent to, or less than that of the first shield layer 80. The second shield layer 85 may alternatively be made of a dielectric material or another suitable non-magnetically conductive material. In the present illustration, the second shield layer 85 is formed over, and substantially covers the second contact element 84 and the insulating layer 86, and extends to the opposite end of the read/write element 50. According to another embodiment, the read section 61 can be arranged as a four point probe with the addition of two voltage leads above or below the GRM element 62.

An electrically nonconductive, magnetic biasing element 89 (FIG. 4) may be positioned behind the combination of the first contact element 82, the GMR element 62 and the second contact element 84. The biasing element 89 is sandwiched between the first shield layer 80 and the second shield layer 85, and produces a magnetic biasing field that extends substantially into the GMR element 62 as indicated by the left-pointing arrow drawn inside the biasing element 89.

A read circuit 102 (FIG. 4) is connected to opposed back ends of the first shield layer 80 and the second pole layer 96, such that during a read mode the read circuit 102 sends a sensing electric current $I_R$ through the first contact element 82, the GMR element 62, the second contact element 84, and the second shield layer 85. The read-sense current $I_R$ flows perpendicularly through the GMR element 62, thus avoiding the along-the plane electromigration problems and magnetic-biasing due to parallel-current problems associated with earlier designs based on CIP operation (Current In the Plane mode). Reference is made to U.S. Pat. No. 5,576,914 which is incorporated herein by reference, which describes a magnetic read/write head.

The write section 60 is composed of a first pole layer (Pole 1), which in this example is the same as the second shield layer (Shield 2) 85. It should be clear that in another embodiment the first pole layer (Pole 1) may be distinct, and/or separated from the second shield layer (Shield 2) 85.

Figure 3:
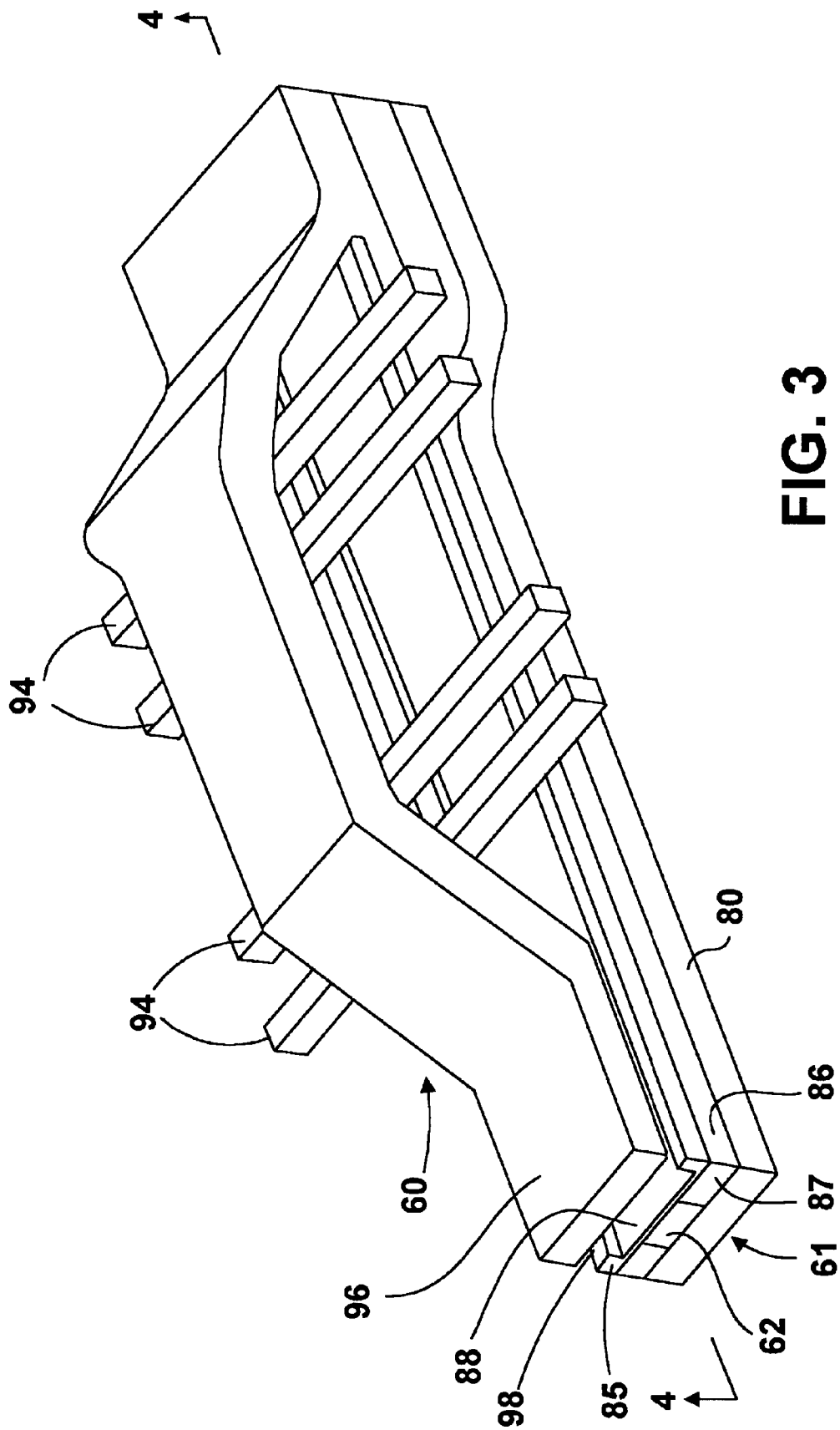
FIG. 3 is an enlarged perspective view of a hybrid read/write element forming part of the read/write head of FIGS. 1 and 2, and integrating an opto-inductive write section and a magnetic (GMR) read section according to the present invention.
Figure 3:
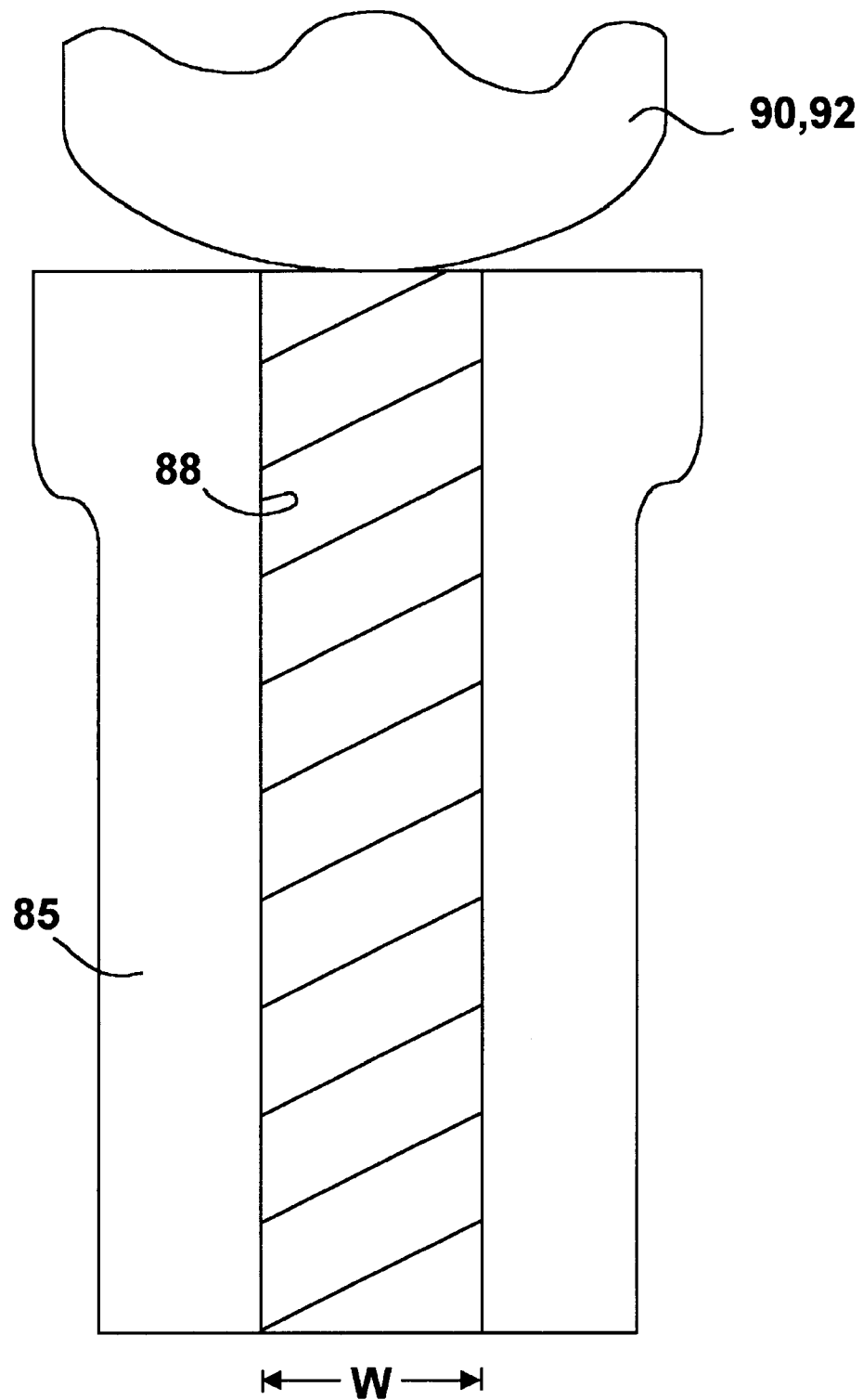
Figure 4:
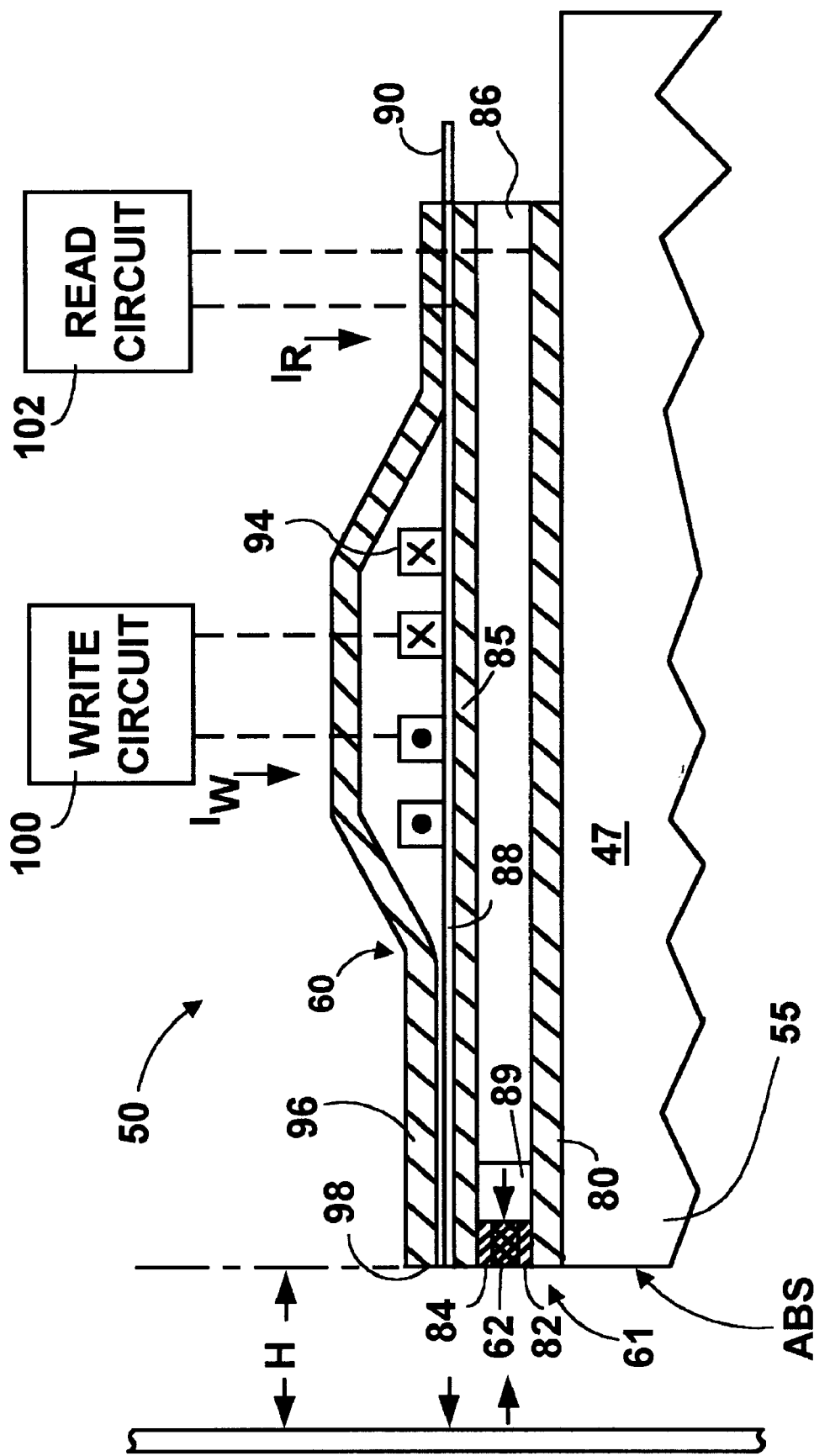
FIG. 4 is a cross-sectional view of the read/write element of FIG. 3 taken along line 4—4, and shown positioned on a slider relative to a data storage medium.

Optionally, conductive coil elements 94 (four of which are illustrated in FIGS. 3 and 4), also forming part of the write section 60, are provided over the insulating layer 86 to act as a supplemental write coil for conducting current to the write element 60. The write coil (also designated herein by the reference numeral 94) may have two, four or more turns depending upon the write field needed in the write element 60. In another embodiment the write coil 94 may be omitted altogether.

An optical channel 88 is formed within and along the length of the second shield layer 85. The optical channel 88 acts as a waveguide for a laser beam that provides the required energy to heat a MO data layer 225 (FIG. 9) within the disk 14 to a critical temperature close to its Curie temperature, in order to write and erase data. As the critical temperature is reached, the field strength in the MO data layer magnetic domain (the coercivity of the magnetic data layer) is greatly reduced. An external magnetic field generated by the opto-inductive write section 60 is then used to reverse the field in the domain, as desired, to record a digit "1" or "0". Data is recorded by orienting the magnetization of a spot or domain in either an up or a down direction. The read/write element 50 reads the recorded data by measuring the change in the resistance of the GMR element 62.

Figure 5:
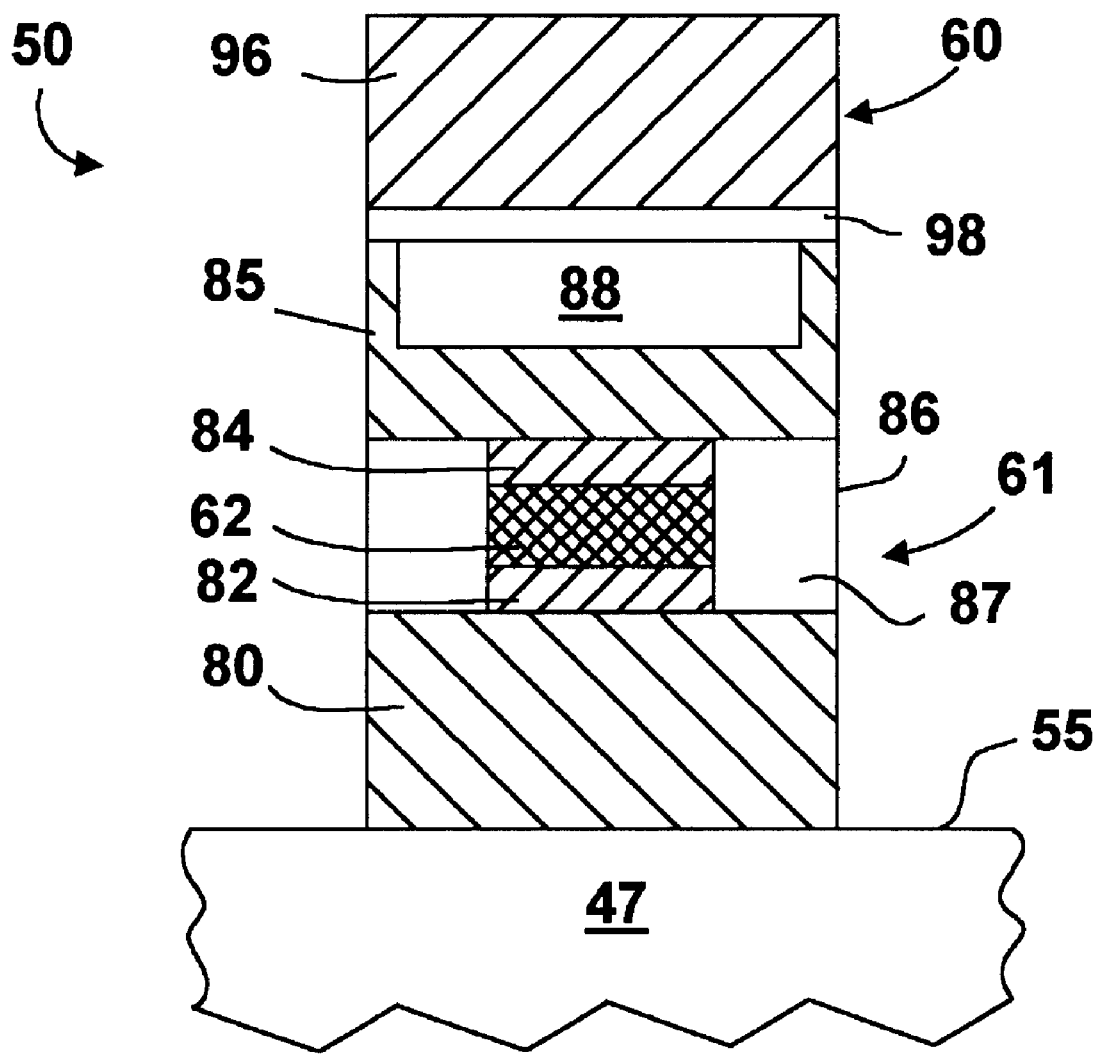
FIG. 5 is an enlarged, partial, front elevational view of the read/write element of FIG. 4 with selective hatching for added visual clarity.

As illustrated in FIG. 3A, an exemplary optical channel 88 is linear and generally uniform along substantially its entire length. With further reference to FIG. 5, the optical channel 88 has a rectangular cross-sectional surface area ranging between approximately 150 microns square and approximately 400 microns square (preferably 250 microns square), in order to readily accommodate an optical fiber or some other transmission heat/optical means. It should however be clear that other cross-sectional configurations can be employed (e.g. circular, rectangular, elongated, etc). In a preferred embodiment, the width W of the optical channel 88 is larger than the width of the GMR element 62, as the width W of the optical channel 88 determines the width of the data tracks on the disk 14. In a preferred embodiment, the width W of the optical channel 88 can vary between approximately 1.5 to 5 times the width of the GMR element 62 (other ranges may also be appropriately selected dependent on the application used).

The optical channel 88 may be formed by means of available thin-film technology. One manufacture process is to pattern the second shield layer 85 and the adjacent insulating layer 86 with photoresist material, and then etch a cavity using available techniques such as ion milling. An optical fiber 90 (FIGS. 3A, 4, 6) can either be passed through at least part of the optical channel 88, or abuts against (or coupled to) the optical channel 88 to transmit heat, or a light beam (i.e., a laser beam) from a laser source 92 for impinging a target spot the disk 14. According to another embodiment, the optical fiber 90 passes, at least partly through the optical channel 88. According to yet another embodiment (FIG. 3A) the source 92 abuts against, or is in close proximity to the optical channel 88.

The optical channel 88 may be filled with an optical material having the appropriate index of refraction to conduct and optionally focus the light beam. It should be clear that the optical channel 88 may be filled with more than one optically (and/or thermally) transmissive material.

Another manufacture process includes starting with a film of optical material and through available thin film techniques, etching it away to form the optical channel 88 and then patterning and forming the second shield layer 85 and the adjacent insulating layer 86, in essence reversing the manufacture process described above.

With reference to FIGS. 3, 4, 5, a second pole layer 96 made of an electrically and magnetically conductive material that is similar or equivalent to that of the first shield layer 80 and the first pole layer 85, is formed over the first pole layer 85 and defines a write gap 98 therewith. The thickness of the second pole layer 96 is substantially the same as (or optionally greater than) that of the first shield layer 80. The write gap 98 may be filled with a material similar or equivalent to that of the insulating layer 86. In one embodiment, the optical channel 88 is located adjacent to (or in close proximity to) the write gap 98.

Figure 11:
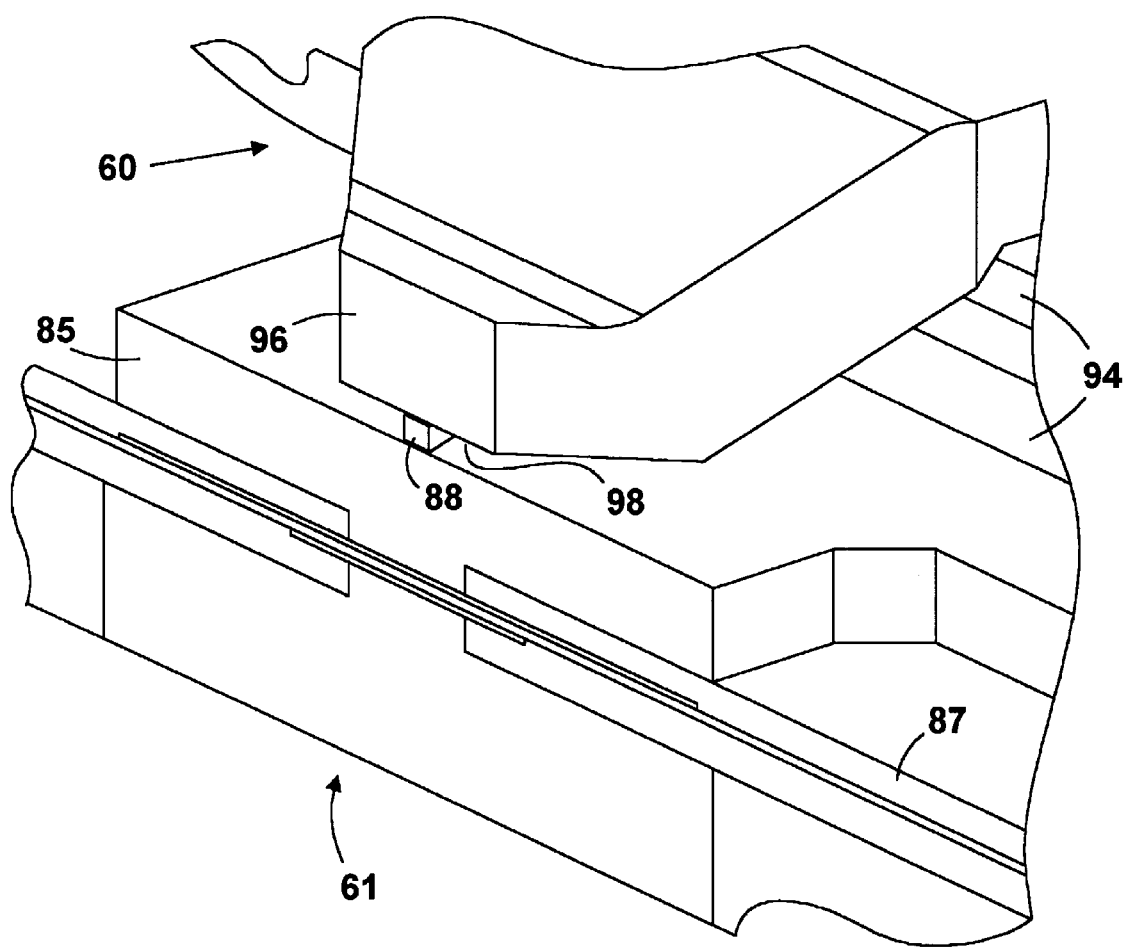
FIG. 11 is an enlarged, partial, front elevational view of a read/write element according to a preferred embodiment of the present invention, showing an optical channel or an optical fiber formed or disposed within a write gap.

FIG. 11 illustrates a preferred embodiment according to which the optical channel 88 is formed within the write gap 98, wherein the optical channel 88 can be an optical guide. Either of the manufacturing methods described above can be used to form or lay an optical fiber (denoted by the reference numeral 88 in FIG. 11) within the write gap 98. The fiber can be coated with a reflective, non-magnetic layer which fills the rest of the write gap 98 adjacent (or in close proximity) to the fiber. A planarization step can be used to assure the same or substantially similar heigth of both the gap 98 and the fiber.

A write circuit 100 (FIG. 4) is connected to the write coil 94, and, during a write mode, it sends an electrical current $I_w$ to induce a flux flow through the write gap 96. Changes in the flux flow across the write gap 96 produce the different magnetic orientations of vertical magnetized regions or domains in the disk 14 during a write operation, when the disk 14 is heated by the laser beam.

While the present read/write element 50 has been described with reference to the read/write head in U.S. Pat. No. 5,576,914, it should be understood that other read/write heads may be modified in accordance with the inventive principle of the present invention. One such read/write head is described in U.S. Pat. No. 5,446,613, which is incorporated herein by reference. Moreover, while the invention is described in relation to a GMR read sensor, it should be understood that any other suitable magnetic read sensor may be used, for example a magnetoresistive (MR) sensor, a spin valve or a Current In the Plane mode (CIP) sensor.

With reference to FIGS. 2, 3A, 4, 5, 6, the read/write element 50 is mounted at the trailing end 55 of the slider 47 so that its forwardmost tip is generally flush with the air bearing surface (ABS) of the slider 47. In another embodiment according to the present invention more than one read/write element 50 (shown in dashed lines in FIG. 2) may be secured to the trailing end 55 or other side(s) of the slider 47. According to another embodiment wherein the read/write head 35 includes more than one read/write element 50, one of the read/write elements 50 may be capable of magnetic write/magnetic read operation, and another read/write element 50 may be capable of opto-magnetic write/magnetic read operation. Different magnetic/optical read/write operations can also be accomplished using the read/write heads described herein.

Figure 2:
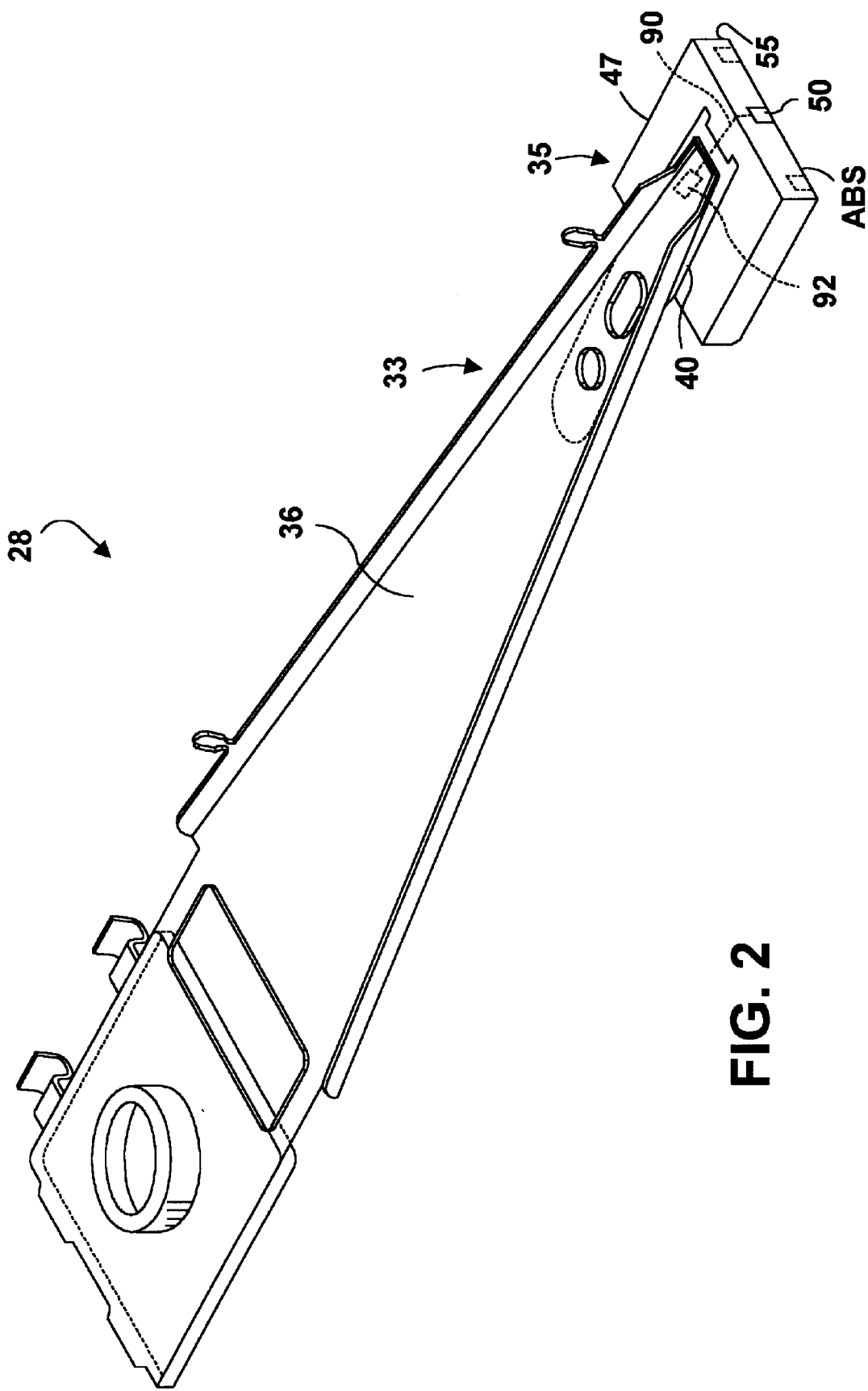
FIG. 2 is a perspective view of a head gimbal assembly comprised of a suspension, and a slider to which the read/write head of FIG. 1 is secured, for use in a head stack assembly.

The light source 92 can be mounted at any convenient location in proximity to the read/write element 50. For example, the heat source may be a light (or heat) emitting diode or a laser diode chip mounted on the backside of the slider 47 (FIG. 6) or on the load beam 36 (FIG. 2). One laser diode chip is referenced in "The Physical Principles of Magneto-optical Recording" by Masud Mansuripur, pages 17–20 (1995). It should be clear that the placement of the read/write element 50 is not limited to these two locations, and that other suitable locations may be selected. While the light source 92 is disclosed herein as providing the necessary energy for heating the target spots on disk 14, it should be clear that alternative heat or energy sources may be used to achieve this purpose. One such heat source can be a heated wire, probe, tip or point source of heat located in close proximity to the disk surface. Additional mechanical and/or optical components may be added to aid in the transmission of the heat/light to the target spot on or within the disk 14.

The present head design enables writing (or recording) on the disk 14 at high data transfer rates or frequencies, between approximately 75 MHz and 500 MHz, but is not limited to this range.

In another embodiment according to the present invention, the placement of the optical channel 88 is not limited to the gap or second shield layer 85. Rather, an alternative or complementary optical channel can be formed within the first shield layer 80.

Figure 6:
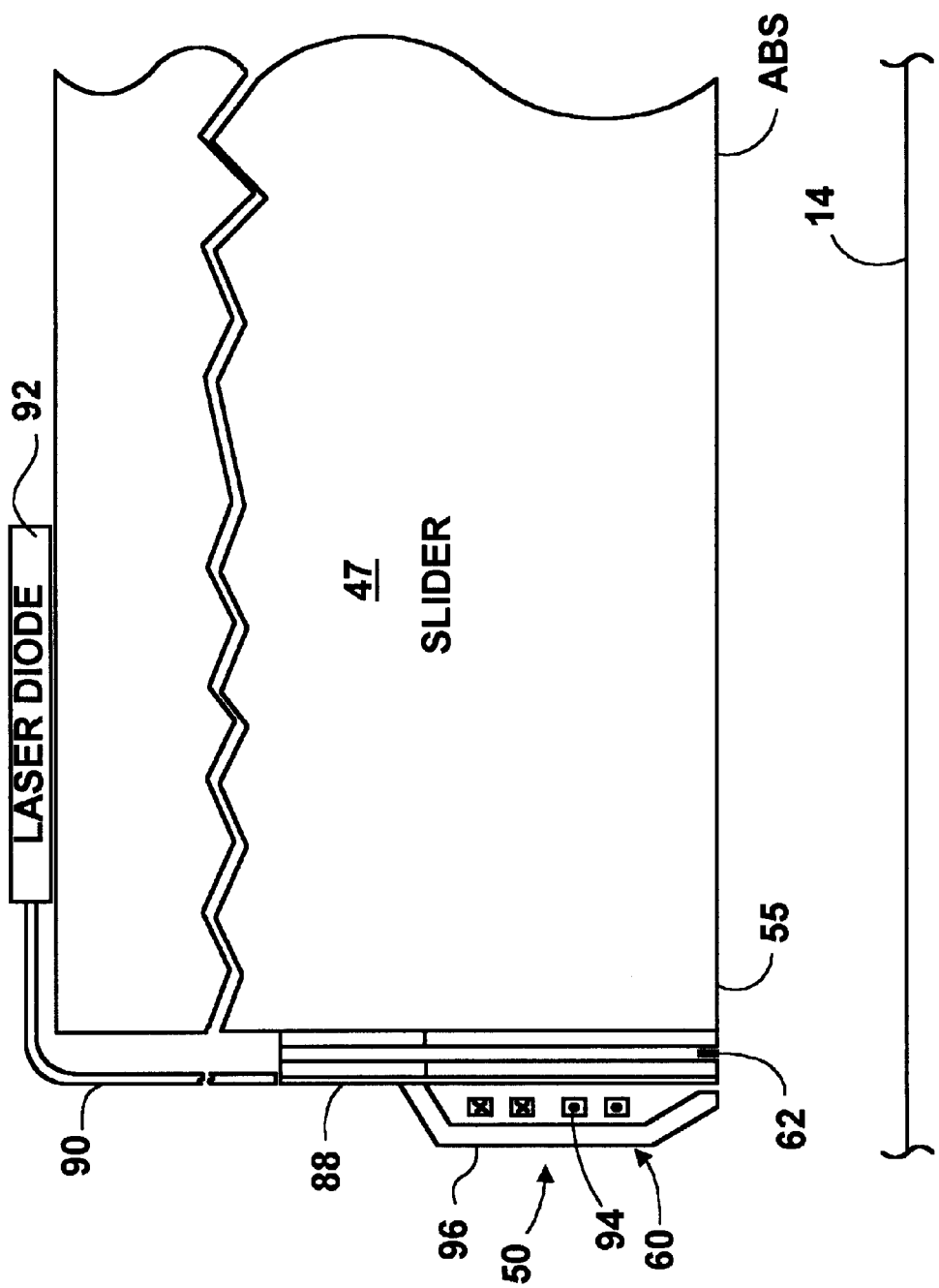
FIG. 6 is a partial cross sectional view of the read/write element of FIG. 3 taken along line 4—4, shown positioned on the slider relative to the data storage medium, and further illustrating an optical assembly, such as a laser diode chip mounted on the slider.
Figure 6A:
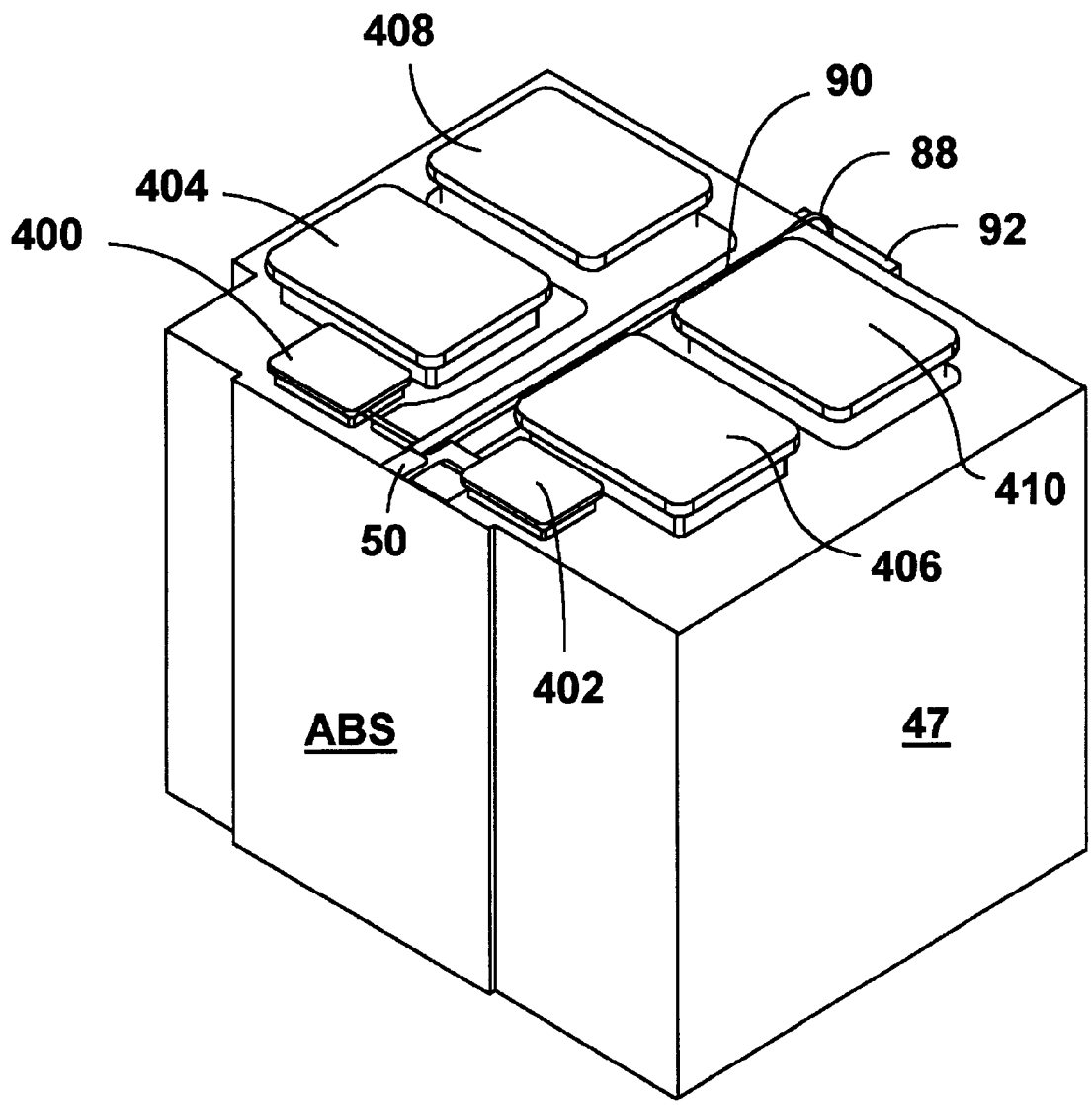
FIG. 6A is a perspective view of the slider of FIG. 6 showing the read/write element, two contact pads for the coil for use in the write operation, and four contact pads for the read operation.

FIG. 6A illustrates the slider 47 of FIG. 6 showing the read/write element 50, two write contact pads 400, 402 for the coil for use in the write operation, and four read contact pads 404, 406, 408, 410 for the read operation. Two of the four read contact pads, for example 404, 406 are respectively connected to two voltage sense leads 411, 415 (FIG. 8B) that are disposed on either side of the GMR element 62.

Figure 7:
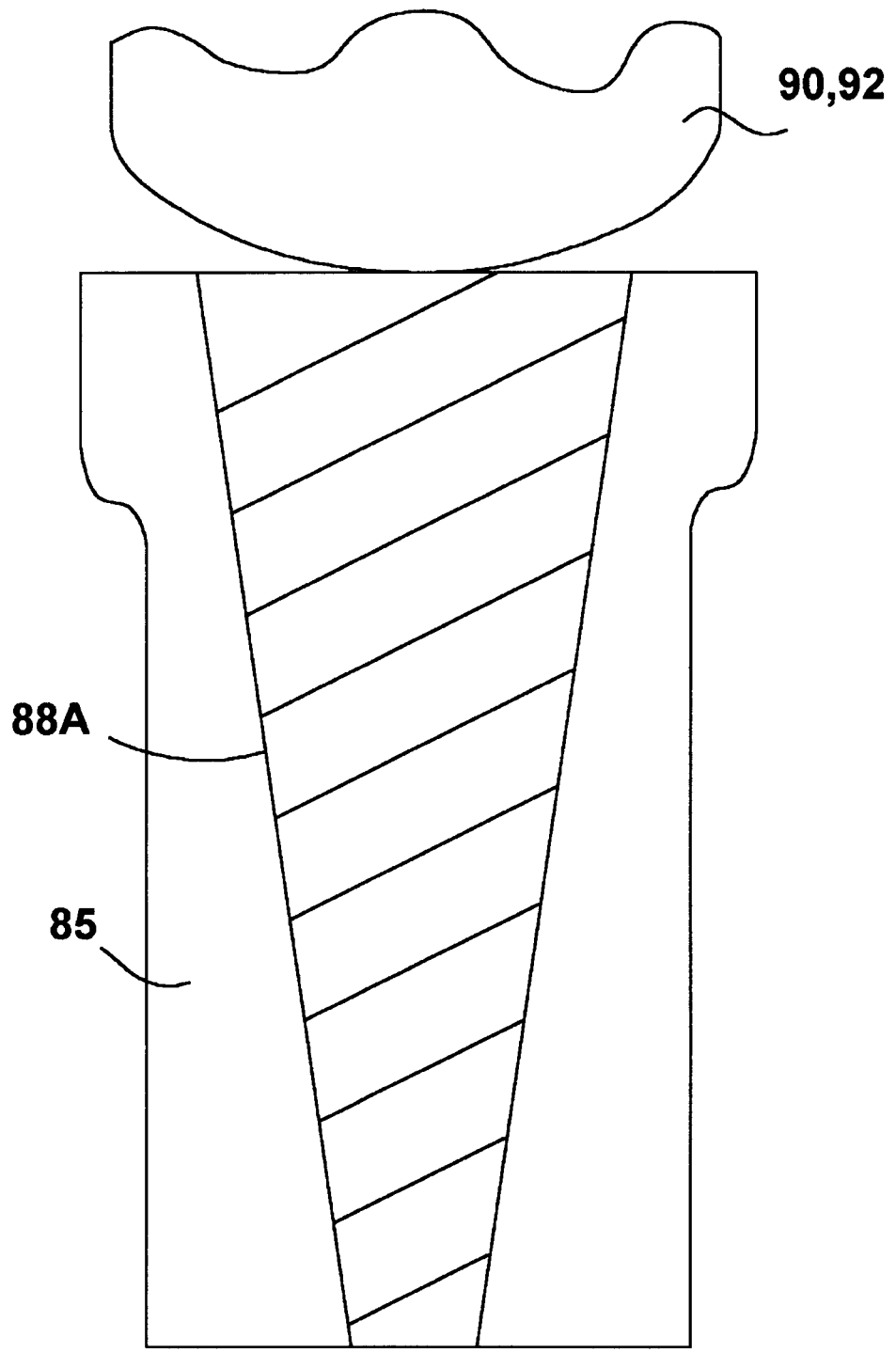
FIG. 7 is an enlarged view of a first pole (Pole 1/Shield 2) forming part of the read/write element of FIG. 3, illustrating a tapered or funnel-shaped optical channel according to another embodiment of the present invention.

FIG. 7 illustrates another optical channel 88A having a similar function to, but a different shape than the optical channel of FIG. 3A. The optical channel 88A has a tapered or funnel shape, and can be filled with an optical material as described above in connection with the optical channel 88. The funnel shape of the optical channel 88A allows an optical fiber to be wedged secured within the optical channel 88A, for allowing the large area at the end of the channel 88A to be couple to the fiber 90.

Figure 8:
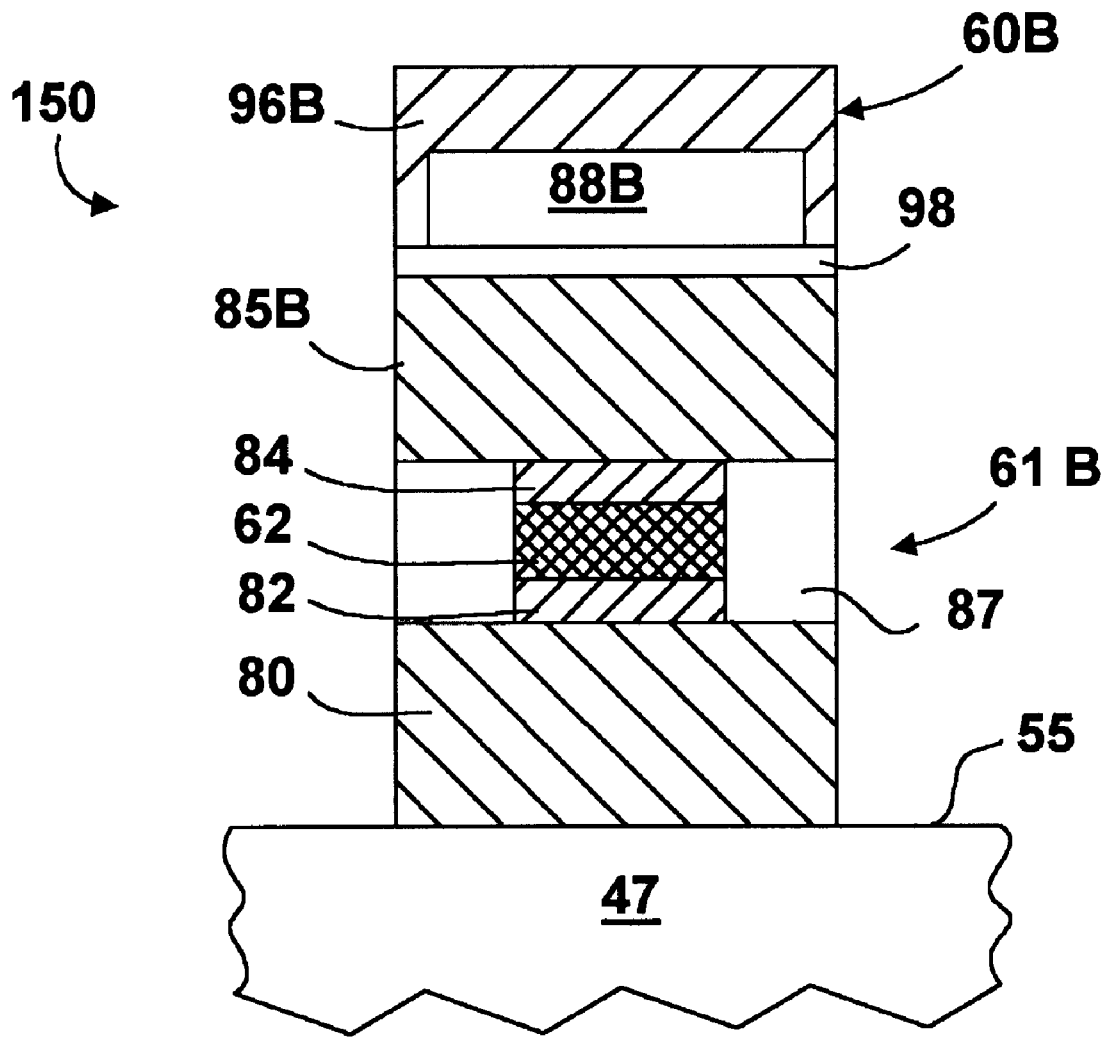
FIG. 8 is an enlarged, partial, front elevational view of a read/write element of FIG. 7, according to another embodiment of the present invention, with selective hatching for added clarity.
Figure 8B:
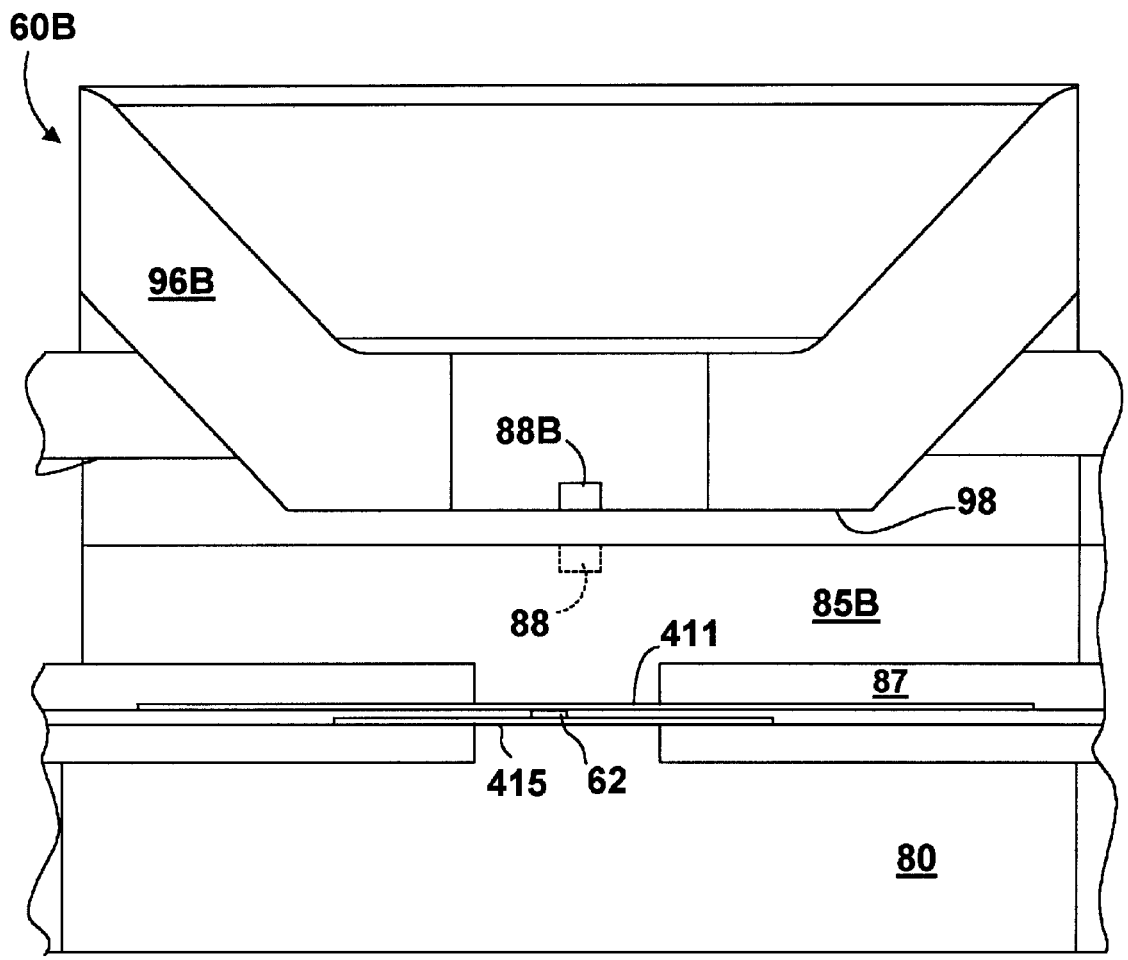
FIG. 8B is an enlarged front elevational view of the read/write element of FIG. 8.

FIG. 8 illustrates yet another read/write element 150 which is generally similar in function and design to the read/write element 50 described above in connection with FIGS. 1–7, with the exception that the opto-inductive write section 60B is modified so that the optical channel 88B is formed within the second pole layer 96B rather than within the first pole layer 85B, but still in proximity to (or adjacent to) to the write gap 98. The optical channel 88B extends rearward on the surface of the plane defined by the write gap. In yet another embodiment, the optical channel (88, 88B) can be formed partly within the first pole layer (85 or 85B), and partly within the second pole layer (96 or 96B), as illustrated in FIG. 8B. If a laser diode chip (or an energy source) is disposed within, on, or in proximity to the read/write element 150, the conductors 94 may be connected to the laser diode chip to feed it with the necessary power, that is a current between approximately 50 mA to 300 mA.

Figure 9:
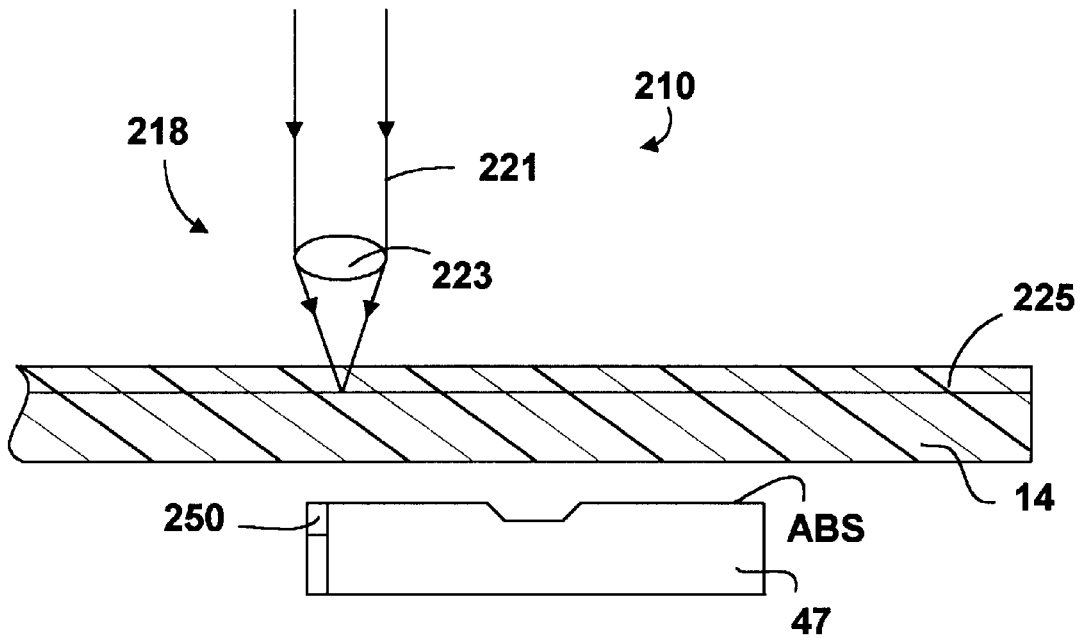
FIG. 9 is a fragmentary, partly sectional, side elevational view of a storage system according to the present invention, and utilizing a read/write head secured to a slider and comprising a non-integrated opto-inductive write section, and a magnetic (GMR) read section, wherein an inductive component of the opto-inductive section is mounted on the slider and is disposed on the opposite side of a disk relative to an optical component of the opto-inductive section.

FIG. 9 illustrates a storage system 210 according to the present invention, which utilizes a read/write element 250 shown mounted on the slider 47. The read/write element 250 is similar to the read/write element 50 or the read/write element 150; however, it includes an opto-inductive write section which is not integrated with the magnetic read section. In this embodiment, the inductive component of the opto-inductive write section is mounted on the slider 47 and disposed on the opposite side of a disk 14 relative to an optical component 210 of the opto-inductive write section. The optical component 210 includes a lens 223 that focuses a light beam 221 from the energy (i.e., laser, light or heat) source, onto a magneto-optical layer 225 formed within the disk 14. Beside the separation of the inductive and the optical components of the opto-inductive write section, the design and operation of the read/write element 250 is generally similar to the read/write element 50 and/or the read/write element 150.

Figure 10:
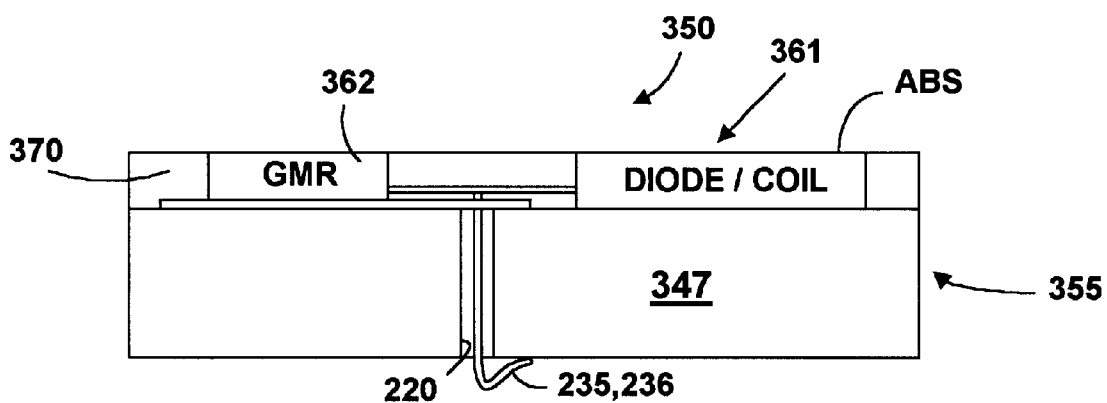
FIG. 10 is a front elevational view of another read/write head embodiment according to the present invention, and formed of a two non-integrated sections: an opto-inductive write section and a magnetic (GMR) read section.

FIG. 10 is a front view of the trailing end 355 of a slider 347 shown carrying a read/write element 350 according to another embodiment of the present invention. The read/write element 350 has the same or equivalent function as that described in connection with the other read/write heads disclosed herein, however it includes an opto-inductive write section 361 which is not integrated with the magnetic read section 362. In this embodiment, the opto-inductive write section 361 is separated from the magnetic read section 362.

The slider 347 includes a recessed section 370 in proximity to the trailing end 355, which recessed section 370 does not have a significant effect on the lift forces generated by the air flow over the air bearing surface (ABS) that is the surface of the slider 347 facing the disk 14. The inductive component of the opto-inductive write section 361 can be any suitable inductive coil, such as the coil assembly described in the patent application titled "Electro-Magnetic Coil Assembly", Ser. No. 08/965,340, filed on Nov. 6, 1997 by Yugang Wang and Tatsuaki Hishida, assigned to the same assignee of the present invention, which is incorporated herein by reference. The optical component of the opto-inductive write section 361 can be any suitable energy source as described above. The opto-inductive write section 361 is secured to the underside (or air bearing surface side) of the slider 47. The read section 362 can be any suitable magnetic read sensor. The slider 347 further includes a channel 220 through which electrical conductors 235 are run.

It should be understood that the geometry, compositions, and dimensions of the elements described herein may be modified within the scope of the invention. In addition, while the invention has been described in connection with disk drives, it should be clear that the invention can be alternatively used in various other applications.

What is claimed is:

1. A read/write element for recording data bits on a data layer and for reading recorded data bits from the data layer, comprising:
    a write section including:
        a thermal energy source for raising the temperature of at least a portion of the data layer where data bits will be recorded, to a predetermined range; and
        a magnetic field source that generates a magnetic field at, or in proximity to said heated portion of the data layer, for controlling the orientation of data bits being recorded; and
    a magnetic read section that reads recorded data bits by detecting the orientation of the recorded data bits;
    wherein said write section includes a first pole layer made of a magnetically conductive material;
    wherein said write section includes a channel for transmitting thermal energy;
    wherein said read section includes:
        a first shield layer made of a magnetically conductive material;
        an insulating layer formed over said first shield layer to define a read gap;
        a magneto-resistive element formed within said read gap; and
        a second shield layer made of a magnetically conductive material formed over said insulating layer.

2. A read/write element according to claim 1, wherein said read section further includes a first contact element made of a magnetically non-conductive material, and formed over a forward portion of said first shield layer.

3. A read/write element according to claim 1, wherein said read section includes a giant magnetoresistive (GMR) element.

4. A read/write element according to claim 2, wherein said read section includes a giant magnetoresistive (GMR) element formed over said first contact element; and
    a second contact element made of a magnetically non-conductive material and formed over said GMR element.

5. A read/write element according to claim 4, wherein said insulating layer is formed over said first shield layer.

6. A read/write element according to claim 5, wherein said second shield layer is formed over said second contact element.

7. A read/write element according to claim 1, further includes an electrically nonconductive, magnetic biasing element positioned intermediate said first shield layer and said second shield layer.

8. A read/write element according to claim 1, wherein said channel transmits thermal energy.

9. A read/write element according to claim 1, wherein said channel is filled with at least one heat transmissive material for transmitting thermal energy.

10. A read/write element according to claim 1, wherein said channel is an optical channel formed at least in part within said first pole layer.

11. A read/write element according to claim 1, wherein said channel is a waveguide through which a laser beam travels to provide thermal energy to heat the data layer to a desired temperature range.

12. A read/write element according to claim 1, wherein said write section further includes a write coil.

13. A read/write element according to claim 1, wherein said channel has a generally uniform width along substantially its entire length.

14. A read/write element according to claim 1, wherein said channel has a cross-sectional surface area ranging between approximately 150 microns square and approximately 400 microns square.

15. A read/write element according to claim 1, wherein said magneto-resistive element has a width; and
    wherein said channel has a width that is greater than the width of said magneto-resistive element.

16. A read/write element according to claim 1, further including an optical fiber that transmits an optical beam to said channel.

17. A read/write element according to claim 1, wherein said channel is filled with an optical material with an index of refraction that is sufficient to conduct and focus an optical beam.

18. A read/write element according to claim 1, wherein said channel is filled with two or more optically transmissive materials.

19. A read/write element according to claim 1, further including a second pole layer made of a magnetically conductive material and formed over said first pole layer for defining a write gap.

20. A read/write element according to claim 19, wherein said channel is formed in proximity to said write gap.

21. A read/write element according to claim 19, further including an optical guide disposed within said write gap to define said channel.

22. A read/write element according to claim 19, wherein said channel is formed at least in part within said first pole layer and at least in part within said second pole layer.

23. A read/write element according to claim 1, wherein said channel is funnel shaped.

24. A read/write element according to claim 1, wherein said thermal energy source is any one or more of a heated wire, a probe, or a point source.

25. A read/write element according to claim 1, wherein said write section and said read section are physically separated.

26. A read/write element according to claim 1, wherein said read section includes a spin valve sensor.

27. A read/write element according to claim 1, wherein said read section includes a Current In the Plane mode (CIP) sensor.

28. A method for recording data bits on a data layer and for reading recorded data bits from the data layer, comprising:
    using a write section that includes:
        a thermal energy source for raising the temperature of at least a portion of the data layer where data bits will be recorded, to a predetermined range; and a magnetic field source that generates a magnetic field at, or in proximity to said heated portion of the data layer, for controlling the orientation of data bits being recorded; and using a magnetic read section that reads recorded data bits by detecting the orientation of the recorded data bits wherein said write section includes a first pole layer made of a magnetically conductive material;

wherein said write section includes a channel for transmitting thermal energy;

wherein said read section includes:
a first shield layer made of a magnetically conductive material;
an insulating layer formed over said first shield layer to define a read gap;
a magneto-resistive element formed within said read gap; and
a second shield layer made of a magnetically conductive material formed over said insulating layer.

29. A head according to claim 1, further including a read circuit connected to said read section to send a sensing electric current through said read section during a data read operation.

30. A head according to claim 1, wherein said write section includes a coil; and
further including a write circuit connected to said write section to send an electric current through said coil during a data write operation.

31. A read/write element according to claim 1, wherein said write section and said read section are integrated.

32. A read/write element according to claim 31, wherein said thermal energy and said magnetic field are applied in a substantially coincident manner on said at least portion of the data layer for recording data bits.

33. A read/write element according to claim 31, wherein said magnetic field is applied when the temperature of said at least portion of the data layer is within a predetermined range.

34. A read/write element according to claim 1, wherein said thermal energy source generates a laser beam.

35. A read/write element according to claim 34, wherein the data layer includes at least one data track along which the data bits are recorded; and
wherein the width of said laser beam determines the width of said at least one data track.

36. A read/write element according to claim 3, wherein the width of said channel varies between approximately 1.5 times to approximately 5 times the width of said GMR element.

37. A read/write element according to claim 1, wherein at least some of the recorded data bits have horizontally oriented domains.

38. A read/write element according to claim 1, wherein at least some of the recorded data bits have vertically oriented domains.

39. A read/write element according to claim 1, wherein said at least portion of the data layer is heated to approximately a critical temperature.

40. A read/write element according to claim 39, wherein said critical temperature is close to a Curie temperature of said at least portion of the data layer.

41. A read/write element according to claim 3, wherein said GMR element reads the recorded data by measuring a change in the resistance of said GMR element.

42. A read/write element according to claim 16, wherein said optical fiber is passed through at least part of said channel.

43. A read/write element according to claim 16, wherein said optical fiber abuts against said channel.

44. A read/write element according to claim 16, wherein said optical fiber is optically coupled to said channel.

45. A read/write element according to claim 16, wherein said write section further includes a write gap; and
wherein said channel is located in proximity to said write gap.

46. A read/write element according to claim 1, wherein said thermal energy source includes a laser diode chip.

47. A read/write element according to claim 1, wherein said write section and said read section are not integrated.

48. A read/write element according to claim 47, wherein said write section and said read section are positioned side by side relative to each other.

49. A head according to claim 1, wherein said write section and said read section are integrated.

50. A method according to claim 28, wherein using said write section includes using a write section which is integrated with said read section.

51. A method according to claim 50, wherein using said write section includes applying the thermal energy and the magnetic field in a substantially coincident manner on said at least portion of the data layer for recording data bits.

52. A method according to claim 50, wherein using said write section includes applying said magnetic field when the temperature of said at least portion of the data layer is within a predetermined range.

53. A method according to claim 28, wherein using said read section includes using a giant magneto-resistive (GMR) element;
wherein the width of said channel varies between approximately 1.5 times to approximately 5 times the width of said GMR element.

54. A method according to claim 28, wherein using said write section includes recording data bits with horizontally oriented domains.

55. A method according to claim 28, wherein using said write section includes recording data bits with vertically oriented domains.

56. A method according to claim 28, wherein using said write section includes using a channel for transmitting thermal energy, and further using an optical fiber to transmit an optical beam to said channel.

57. A method according to claim 28, wherein using said write section includes using a write section and a read section that are not integrated.

58. A method according to claim 28, further including positioning said read section and said write section side by side relative to each other.

59. A method according to claim 28, wherein said magnetic field source includes a coil mounted; and
further including mounting said coil on a slider.

60. A method according to claim 59, further including disposing said coil on one side of the data layer; and
and disposing said thermal energy source on an opposite side of the data layer.

61. A read/write element according to claim 1, wherein said write section includes a near field write element.

* * * * *